3,394,120
PROCESS OF EXTRACTING PROTEIN FROM MISTLETOE AND RESULTANT PRODUCT
Frederic Vester, Saarbrucken, Germany, assignor to Ciba Corporation, New York, N.Y., a corporation of Delaware
No Drawing. Filed Mar. 27, 1964, Ser. No. 355,429
Claims priority, application Switzerland, Apr. 4, 1963, 4,332/63
16 Claims. (Cl. 260—112)

ABSTRACT OF THE DISCLOSURE

A new protein obtained from plant material of Viscum or Loranthus species (mistletoe); exhibits tumour-inhibiting effects.

---

The present invention concerns a new protein, having a tumour-inhibiting action, in purified form, and a process for its manufacture starting from plant material of Viscum species, more especially of *Viscum album* L. *sensu latiore* or Loranthus species, more especially *Loranthus europaeus* L., which are collectively referred to below by the short term "mistletoe."

Mistletoe has been used in medicine for hundreds of years. In particular, its action in the treatment of epilepsy and vertigo has been established by Plini in the second century A.D. Nowadays mistletoe preparations are also used to treat high blood pressure, vascular diseases and arteriosclerosis. The preparations thus used are crude, or so-called "total," extracts. Suggestions made by Rudolf Steiner concerning the potential anti-neoplastic action of certain mistletoe preparations were taken up in the twenties of the present century and likewise led to the manufacture of crude extracts to which a certain effect in the treatment of cancerous diseases was attributed. It was therefore obvious to try to prepare active principles from plant material of *Viscum album*. Apart from choline and acetylcholine, urson and certain resin alcohols, it was above all viscotoxin (K. Winterfeld and M. Leiner, Naturwissenschaften, 42, p. 487 [1955]) which was isolated in this connection. This product is a polypeptide which is distinguished by its cardial effect and has in addition very strongly irritant and necrotizing properties. The shrivelling of vaccination tumours in mice observed on intratumoural administration of mistletoe total extracts has been attributed to the aforementioned necrotizing properties of viscotoxin.

The extremely toxic properties of viscotoxin, however render the intravenous administration of the substance or of total extracts very difficult, and the effect of such a systemic treatment on the growth of tumours is, in contradistinction to the practically insignificant intratumoural treatment, at best doubtful.

Recently, the protein-like constituents of mistletoe press juice have become objects of interest.

Inter alia, Selawry, Vester, Mai and Schwartz [Hoppe-Seyler's Zschr. physiol. Chemie, 324, pp. 262–281 [1961]) have conducted a test series concerning the influence of different separation methods on the mistletoe press juice. In this connection it was found that the clarified juice yields on precipitation with acetone or more especially with ammonium sulfate to a molarity of 1.9 and subsequent dialysis and vacuum drying of the retentate, a protein-like product which has a higher antitumoural effect than the starting material but is still substantially toxic.

Likewise, Winterfeld et al. (Arzneimittelforschung 13, p. 29, [1963]) concentrated their attention on the protein components. They precipitated an aqueous mistletoe extract with hydrochloric acid. The resulting fractions—which had certainly been denatured by the hydrochloric acid treatment—likewise are more active than the starting material but they, too, have a substantial toxicity.

The present invention is based on the observation that from plant material of *Viscum album* L., and Loranthus species, more especially of mistletoe growing on deciduous trees such as oaks, appletrees or poplars, a new, native protein can be isolated in purified form. This protein was accorded the references N$x$1. It can be resolved into individual fractions which have been given the references explained below. This protein, or its individual fractions or mixtures thereof, have about 100 times the antitumoural activity of the clear juice and are comparatively little toxic. The antitumoural action was examined, for example, on ascitic tumours, such as sarcoma 180 on Swiss mice and also on cell cultures (for example Hela or sarcoma 180 cultures, and Chang liver).

Protein N$x$1 is further distinguished by the absence of an action on the blood pressure and other undesirable effects of the mistletoe total extracts or other known, less pure or already denatured protein-like products.

The new protein is therefore suitable for use as a medicament in combating tumours and other cancerous conditions.

Acid hydrolysis of the protein of the invention gives rise to the following aminoacids (content in percent shown in parentheses):

Cystein (2.9), methionine (1.6), histein (1.3), tyrosine (3.8), phenylalanine (3.8), lysine (5.7), isoleucine (6.7), proline (5.4), threonine (5.8), serine (6.0), leucine (8.1), glutamic acid (9.2), alanine (6.0), aspartic acid (11.2), glycine (6.6), arginine (13.5) and ammonia (about 7.2). The high content of arginine is particularly striking.

The new protein and its constituents are obtained when the press juice of plant material of mistletoe, preferably one of the species referred to above, and above all the press juice obtained from stalks and leaves, is freed from sludge-like impurities, advantageously by centrifugation, the resulting clear juice or an equivalent aqueous extract is (a) Adjusted with an aqueous ammonium sulfate solution to a molarity of about 1, or with another salt solution to a molarity corresponding to an approximately molar ammonium sulfate solution with regard to the salting-out effect, the solution is then isolated from the precipitated material and adjusted by a further, if desired successive, addition of ammonium sulfate solution to a molarity of about 1.9 or with another salt solution to a corresponding molarity, and (b) The constituents salted out in the second salting-out operation are dialysed and the water-insoluble share of the retentate is isolated and then, if desired, (c) The protein obtained in this manner is salted in by treatment with ammonium sulfate solution to a molarity not exceeding about 0.4, or with another salt solution to a corresponding molarity and, if desired, (d) The resulting solution is purified on a polydextran gel, advantageously one that has ion exchanging properties, or an equivalent adsorbent and, if desired, resolved into its individual fractions.

The process described above can be represented by the following diagram (showing also the reference of the fractions):

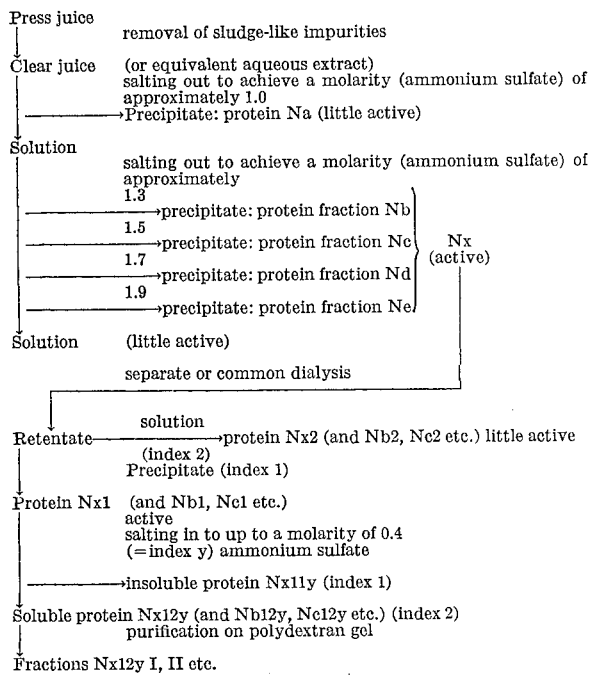

Since the active protein fractions are readily denatured, all the above operations must be performed in the cold, advantageously at about 0° C. The press juice and the clear juice should be processed while they are still very fresh, or else they must be deep-frozen.

The salting-out operations are advantageously performed with an approximately 2–4 molar ammonium sulfate solution, with stirring, and the batch is then left to itself for several hours, advantageously, for example, for 24 hours. The isolation of the precipitate is always performed by sharp centrifugation. Instead of ammonium sulfate any other salt conventionally used for salting out in protein chemistry is suitable.

The dialysis of fractions $Nb$ to $Ne$ (or of mixtures thereof, for example $Nb-d$, $Nc-e$ or $Nb-e=Nx$) is performed, for example, with cellophane hoses against distilled water, the receptacle being advantageously repeatedly changed. The precipitated share of the retentate (designated by index 1, for example $Nb1$, $Nb-e1=Nx1$ etc.) is isolated, advantageously by sharp centrifugation; its activity is already quite considerable and it can be washed, for example with water, and lyophilized for use.

The salting-in which may have to be performed (solution in an aqueous salt solution), is advantageously carried out by the portionwise addition of an aqueous salt solution, for example an 0.35-molar aqueous ammonium sulfate solution or a corresponding other salt solution, each addition being followed by centrifugation and renewed stirring. It is, however, preferable, to use for salting-in only 0.1-molar ammonium sulfate solution to ensure that less of the inactive accompanying substances passes into solution. Towards the end a small amount of distilled water may be used.

The insoluble matter (identified by a further index 1, to which the molarity of the salting-in solution ($y$) can be added, for example $Nb11_{0.1}$ or $Nb11_{0.35}$ is of weak activity, whereas the soluble matter (identified by index 2, for example $Nb12_{0.1}$ or $Nb12_{0.35}$) is very active. The insoluble fractions can be used for example, after having been washed and lyophilized.

It is however preferable to use the soluble fractions ($Nx12_{0-0.4}$ etc., especially $Nx12_{0.1}$ or $Nx12_{0.35}$). Surprisingly, they can be converted into highly concentrated aqueous solutions by being salted out, for example as described above, advantageously with an approximately 3-molar aqueous ammonium sulfate solution, followed by centrifugation, pasting the solid matter with a small amount of water and repeating this operation several times until the centrifugate can be "liquefied" with a little water or buffer to form a highly concentrated solution. Alternatively, these fractions can be freed from the inorganic salts by dialysis, whereupon the retentate is centrifuged and the residue is washed with water and prepared for use by freeze-drying.

It is, however, preferable to purify the solution obtained by salting-in, if desired in the highly concentrated form obtained by salting out and subsequent "liquefaction" as described above.

This purification is advantageously carried out with a polydextran gel, which advantageously has ion exchange properties, above all with basic groups, for example DEAE-Sephadex or an equivalent medium if desired while at the same time resolving the whole into fractions. The adsorbent retains any colored impurities. The elution can be performed, for example, with a sodium acetate buffer (0.1-molar and ascending).

It is advantageous to start with a preliminary purification on a block of adsorbent, such as DEAE-Sephadex, through which the fraction to be purified is filtered. Following this, a proper column chromatography is performed with the same material. For this purpose it is of advantage first to convert the filtered fractions into a highly concentrated solution by salting out and then "liquefying" it as described above, whereby it is possible to work with a substantially smaller amount of material in the chromatography. In the elution, which is performed for instance with a sodium acetate buffer (0.1-molar and ascending) it is possible, for example with the aid of the ultraviolet spectrum with the use of the extinction maxima, to detect a distinct separation into several fractions of which the first one absorbing at about 270 m$\mu$, (I) has the maximum activity.

The fractions can be lyophilized of freed from the salts by precipitation with acetone or another water-miscible organic solvent, or by dialysis, the insoluble phase of the retentate being lyophilized. Alternatively, as shown above, they can be converted into highly concentrated solutions by salting out and "liquefaction" of the precipitates.

A further micro separation can be achieved by starch gel electrophoresis, while in the paper electrophoresis the substances are denatured by the irreversible adsorption on the paper.

According to a specially preferred variant of the process the fraction $Nc-e12_{\text{about 0.1 or 0.35}}$ are prepared which are distinguished by an extremely high activity and a relatively low toxicity.

According to a modification of the process for the manufacture of the new protein there is performed, instead of the salting-out operation (a), a protein precipitation with a water-miscible organic solvent, preferably acetone, or with an alkanol such as methanol or ethanol, whereupon the precipitated protein is worked up as described in stage $b$ and, if desired, stages $c$ and $d$.

The precipitation is likewise carried out at a low temperature, for example at $-5°$ C. to $-10°$ C.

According to another modification of the process the clear juice or a corresponding water extract or the corresponding dry substance is dialysed, whereupon the retentate is worked up according to (a), (b) and is desired (c) and (d) or more advantageously by precipitation with the water-miscible organic solvent, salting-in according to (c) and optionally further processing according to (d).

The protein N*x*1 or its fractions can be used as medicaments for the treatment of cancerous diseases. For this purpose they may be, for example, in the form of pharmaceutical preparations containing them in conjunction or admixing with organic or inorganic pharmaceutical excipients suitable for parenteral administration. The pharmaceutical preparations may be, for example, in the form of dry ampoules. They may be sterilized and/or may contain assistants, such as preserving, stabilizing, wetting or emulsifying agents, salts for regulating the osmotic pressure, or buffers. They may also contain further therapeutically valuable substances.

The following examples illustrate the invention. Temperatures are shown in degrees centigrade.

Example 1

(1) 100 kg. of *Viscum album* (*mali*), garnered in February, are freed within a few hours after plucking from the berries and thick stalks (8 mm. diameter) and thoroughly washed in the cold. The remainder, 88 kg., is disintegrated in a mincing machine while being cooled (small lumps of ice may be added). By deep-freezing the magma to $-20°$ C. the disintegration of the cells is completed and the subsequent pressing gives a larger yield of juice. Expression of the material in a wooden grape press between cloths, with the use of about 10 atmospheres pressure, yields 24 liters of press juice and, after forking the expressed material over and pressing it once more, another 8 liters. The press cake is discarded. The greenish brown, turbid press juice (32 liters) is freed from the green sludge by being centrifuged for 10 minutes at 4000 revolutions per minute at about $0°$ C.; the said sludge is inactive. The clear press juice (31 liters) is deep-frozen to $-20°$ C. (until it is further processed) to preserve the native proteins.

(2a) The clear juice is allowed to thaw and at $0°$ C. 3.8-molar ammonium sulfate solution (=357 ml. per liter of juice) is slowly stirred in and the whole (now a total of 42 liters) is left to itself for 24 hours at $0°$ C. The salted-out protein (N*a*, 1200 g.) is subjected to sharp centrifugation for 5 minutes at $20{,}000g$ in the cold. This protein has little activity towards tumours and is strongly toxic.

(2b) To isolate the bulk of the active crude proteins the supernatant clear juice is further mixed, as above, with 3.8-molar ammonium sulfate solution to make twice the initial amount (i.e. 62 liters), that is to say to achieve a molarity of 1.9, and again left to itself for 24 hours at $0°$. The precipitate formed (N*x*, 900 g.) is subjected to sharp centrifugation, as above, and twice washed with the same volume of a 2.5-molar ammonium sulfate solution, centrifuged, and deep-frozen to $-20°$ C. until it is further processed. The remaining solution still contains a large amount of proteins which can be salted out by means of further additions of ammonium sulfate, but these proteins have no cancerostatic effect. The crude protein salted out at a molarity of 1 to 1.9 has a considerable cancerostatic effect.

(3) The crude protein is suspended with 2 to 3 times the volume of water, with the total volume increasing to 7 liters, and then dialysed at $0°$ C. through "Visking steamless" cellophane hoses, type "thin-walled," pore diameter 24 A, three times for 10 hours each time, against about 100 liters of deionised water and then once for 10 hours against 100 liters of distilled water. Every time when the receptacle is changed, the contents of the hose is vigorously agitated. During the dialysis operation either the hose or the water in the receptacle is kept moving. The share which precipitates in the salt-free retentate (N*x*1, 100 g.) is centrifuged off for 20 minutes at $20{,}000g$ in the cold from the almost inactive soluble share (N*x*2, 200 g.), once washed with twice the amount of distilled water, centrifuged as above, and salted-in with ammonium sulfate in the following manner;

(4) N*x*1, which is insoluble in distilled water, is mixed with an equal volume of 0.35 molar ammonium sulfate solution and homogenized for a short time, for example in a glass homogenizer, with cooling. The material is then sharply centrifuged ($20{,}000g$) for 5 minutes and the operation is repeated until the salted-in supernatant phase has turned the light-brown color of tea (approximately after 6 to 8 repetitions of the salting-in). The whole procedure is then repeated three times with distilled water, during which the molarity drops stepwise, and further amounts of active substance pass into solution. All supernatant phases are combined and can then be further purified or used as they are. For this purpose direct dialysis is used to remove the ammonium sulfate, the retentate is centrifuged, the precipitate washed with a small amount of distilled water and freeze-dried (N*x*$12_{0.25}$, 45 g.). In this form the preparation is stable even without deep-freezing and can be taken up in salt solution for administration. It has a strong cancerostatic activity.

(5) If protein N*x*$12_{0.35}$ is to be further purified, the dark-brown solution (1 liter) containing about 45 g. of N*x*$12_{0.35}$ is placed immediately after the salting-in on 1 kg. of polydextran gel with basic groups (DEAE-Sephadex A 50; makers Messrs. Pharmacia, Uppsala). The adsorbent had first been suspended in water (fine particles were removed by decantation), successively washed with 0.5 N-hydrochloric acid, water, 0.5 N-acetic acid and finally with 0.1-molar sodium acetate buffer (pH 5.5) and poured into a column of about 10 cm. diameter. The brown component of the solution thus applied is retained in the upper portion of the column on elution with 0.1-molar sodium acetate. The first protein fraction absorbing at 270 m$\mu$ is salted out with solid ammonium sulfate to establish a molarity of 3, then left to itself for 24 hours, centrifuged for 5 minutes at $20{,}000g$ (10–20 cc.), suspended with three times the volume of water, and then dialysed for 30 hours against 5 liters of distilled water on each occasion, as described above. The precipitated share of the retentate (N*x*$12_{0.35}$ I, 5 to 10 g.) is then sharply centifuged off for 5 minutes, once washed with three times the volume of water and lyophilized. The product has a high cancerostatic activity.

Example 2

Instead of *Viscum album mali*, garnered in February, *Viscum album popoli*, garnered in Summer until October, is used. While apple mistletoe, garnered in October, gives the same yield of juice but only about one tenth of active protein when garnered in February, in poplar mistletoe garnered in October it is above all the share of N*a* which is considerably reduced, while the yield of crude protein N*x* is still about 400 g., that is to say about half the amount obtained from apple mistletoe garnered in February. From this 400 g. it is possible to isolate after dialysis 38 g. of N*x*1, which then gives corresponding yields of N*x*12 and N*x*12 I. In other respects the methods adapted to the changed amounts were performed as in Example 1.

Example 3

Instead of by salting out with ammonium sulfate as described in Example 1 under (2), the precipitation can be performed by portionwise addition of acetone at $-5°$ C. When no more material precipitates, the addition of acetone is stopped and the solution is kept for 24 hours at $-10°$ C. The precipitated crude protein is centrifuged off, dialysis as in paragraph 3 (Example 1) is performed and the product is further processed in the appropriate manner. Also in this case protein N*x*12 is obtained, followed by N*x*12 I, though in a less good yield.

Example 4

When following upon the Sephadex separation described in Example 1 under (5), the end fraction N*x*$12_{0.35}$ I is precipitated in the cold with acetone instead of of being salted out, the share of the adhering salt (from the 0.1-molar solution) is not so large, and it can be lypohilized as it is without requiring prior dialysis.

Example 5

Instead of being processed as described in paragraph 2 of Example 1, the clear juice can be dialysed before salting out the proteins. Of the approximately 160 g. of dry substance contained in 1 liter of clear juice, 125 g. can be dialysed and 35 g. can not. From the undialysable share the native proteins are then most advantageously precipitated with acetone (cf. Example 3). Precipitation by salting out requires repetition of the dialysis. The share precipitated with acetone is repeatedly washed in the cold with distilled water, each time sharply centrifuged and finally salted-in as described in Example 1 (4) and further processed as described in Example 1 (5).

Example 6

The procedure is as described in Example 1, paragraphs 1 to 3, followed by the operation described in Example 1, paragraph 4, except that the 0.35-molar ammonium sulfate solution is replaced by an 0.1-molar ammonium sulfate solution, to yield fraction $Nx12_{0.1}$ which has a considerable cancerostatic effect.

(5a) The resulting protein solution is filtered through a "DEAE-Sephadex block"; for this purpose a DEAE-Sephadex A 50 layer is prepared in a suction filter, the layer having a height approximately equal to its diameter. For every part by weight of protein 30 parts by volume of moist Sephadex are used. The protein solution is filtered and the residue rinsed with an 0.1-molar sodium acetate+acetic acid buffer of pH 5–6. The filtrate solution is then mixed at 2° C. with stirring with ammonium sulfate until a molarity of 3 has been reached, and the batch is kept for 16 to 24 hours in a refrigerator. The precipitate containing the active principle can be isolated by a short centrifugation, then repeatedly pasted with a very small amount of water and centrifuged each time and converted into a highly concentrated aqueous solution (i.e. it can be "liquefied"). This solution is then cautiously diluted with water or 0.1-molar sodium acetate+acetic acid buffer of pH 5.5 to the concentration suitable for chromatography.

(5b) Chromatography is performed with DEAE-Sephadex A 50 pretreated as described in Example 1. For 20 ml. of solution a Sephadex volume of 140 to 200 ml. suffices at a ratio of diameter:height of 1:20 to 1:40. The whole is then eluted with 0.1-molar sodium acetate+ acetic acid buffer of pH 5.5. The protein fractions that absorb at 270 m$\mu$ are salted out in separate batches by adding solid ammonium sulfate until a molarity of 3 has been reached and then kept for 24 hours at 2° C. and centrifuged; the precipitates are then either dissolved as described above by repeated cautious pasting with a small amount of water and centrifugation, or desalted by dialysis as described in Example 1. In the latter case the entire retentate (precipitate and solution) is lyophilized. The substance $Nx12_{0.1}$ I, obtained from the first eluate fraction absorbing at 270 m$\mu$ displays a high cancerostatic effect.

What is claimed is:
1. Process for the manufacture of a new mistletoe protein, wherein
   (a) a starting material selected from the group consisting of the clear mistletoe juice and an aqueous mistletoe extract is adjusted with an equeous salt solution useful for salting-out proteins to a molarity which corresponds to the molarity of an about 1-molar aqueous solution of ammonium sulfate, the solution is then isolated from the precipitated material, and adjusted by a further addition of said aqueous salt solution useful for salting-out proteins, to a molarity which corresponds to the molarity of an about 1.9-molar aqueous solution of ammonium sulfate and the precipitated material is collected and
   (b) the material resulting from step (a) is dialysed against water and the purifed mistletoe protein is isolated from the retentate as the water-insoluble portion, each of said process steps being carried out in the cold.
2. Process for the manufacture of a new protein according to claim 1, wherein
   (c) the resulting mistletoe protein is salted-in by treatment with an aqueous salt solution useful for salting-in proteins, to a molarity which corresponds to the molarity of an at most about 0.4-molar aqueous solution of ammonium sulfate, to yield the purified protein as the salted-in fraction.
3. Process for the manufacture of a new protein according to claim 1, wherein
   (c) the resulting mistletoe protein is salted-in by treatment with an aqueous salt solution useful for salting-in proteins to a molarity which corresponds to the molarity of an at most about 0.4-molar aqueous solution of ammonium sulfate and
   (d) the resulting solution is purified by adsorption of a polydextran gel and elution therefrom to yield the purified protein.
4. Process according to claim 2, wherein the salting-in is performed with an aqueous salt solution having a salting-in effect equivalent to that of an about 0.1 molar aqueous solution of ammonium sulfate.
5. Process according to claim 3, wherein the salting-in is performed with an aqueous salt solution having a salting-in effect equivalent to that of an about 0.1 molar aqueous solution of ammonium sulfate.
6. Process according to claim 2, wherein the salting-in is performed with an aqueous salt solution having a salting-in effect equivalent to that of an about 0.35 molar aqueous solution of ammonium sulfate.
7. Process according to claim 3, wherein the salting-in is performed with an aqueous salt solution having a salting-in effect equivalent to that of an about 0.35 molar aqueous solution of ammonium sulfate.
8. The process according to claim 1, wherein the salting-out operation (a) is replaced by precipitating the protein by means of an organic solvent miscible with water, and the precipitated protein is subjected to the working up procedure (b).
9. The process according to claim 2, wherein the salting-out operation (a) is replaced by precipitating the protein by means of an organic solvent miscible with water, and the precipitated protein is subjected to the working up procedures (b) and (c).
10. Process according to claim 2, wherein after the salting-in operation (c), a salting-out operation is performed and the salted-out portion is separated by centrifuging, and converted into a member selected from the group consisting of a highly concentrated aqueous solution and a buffer solution by repeated trituration with water and centrifuging.
11. Process according to claim 3, wherein after the salting-in operation (c) at any desired succeeding stage of the process, a salting-out operation is performed and the salted-out portion is separated by centrifuging, and converted into a member selected from the group consisting of a highly concentrated aqueous solution and a buffer solution by repeated trituration with water and centrifuging.
12. Modification of the process according to claim 3, wherein the salting-out operation (a) is replaced by precipitating the protein by means of an organic solvent miscible with water, and the precipitated protein is subjected to the working up procedures (b), (c) and (d).
13. The protein Nx12, said protein furnishing on acid hydrolysis about 2.9% cysteine, about 1.6% methionine, about 1.3% histidine, about 3.8% tyrosine, about 3.8% phenylalanine, about 5.7% lysine, about 6.7% isoleucine, about 5.4% proline, about 5.8% threonine, about 6.0% serine, about 8.1% leucine, about 9.2% glutamicacid, about 6.0% alonine, about 11.2% aspartic acid, about 6.6% glycine, about 13.5% arginine and about 7.2% ammonia prepared according to the process as claimed in claim 2.

14. Process according to claim 3, wherein in operation (d) the protein obtained is resolved into its individual fractions.

15. Process according to claim 9, wherein after the salting-in operation (c) at any desired succeeding stage of the process salting-out is performed and the salted out portion is separated by centrifuging, and converted into a member selected from the group consisting of a highly concentrated aqueous solution and a puffer solution by repeated trituration with water and centrifuging.

16. Process according to claim 12, wherein after the salting-in operation (c) at any desired succeeding stage of the process salting-out is performed and the salted out portion is separated by centrifuging, and converted into a member selected from the group consisting of a highly concentrated aqueous solution and a puffer solution by repeated trituration with water and centrifuging.

References Cited

Hoppe-Seylers Zeitschrift fur Physiologische Chemie Band 324 (Mar. 28, 1961) pp. 261–270, 273–277 and 279–281, Selawry et al.

Arzneimittel Forschung, Jan. 13, 1963, pp. 29–32, Winterfeld et al.

Alexander: Separation and Isolation of Proteins, vol. 1, 1959, pp. 4–7 and 9–19.

Advances in Protein Chemistry, vol. 17, 1962, pp. 209–212.

Chem. Abstracts, vol. 52, 1958, 13625g–13626a, vol. 53, 1959, 18282.

WILLIAM H. SHORT, *Primary Examiner.*

H. SCHAIN, *Assistant Examiner.*